United States Patent Office 3,487,260

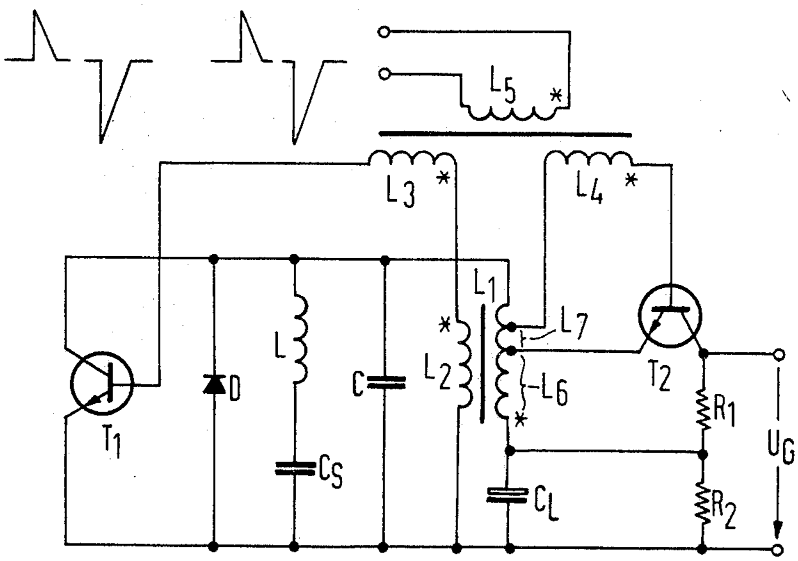
L5
L3
L4
L1
L7
L2
L6
L
D
C
T1
T2
R1
R2
UG
CS
CL

Patented Dec. 30, 1969

3,487,260

HORIZONTAL DEFLECTION CIRCUIT FOR TELEVISION SYSTEM

Günther Eberhard, Munich, Germany, assignor to Siemens Aktiengesellschaft, a corporation of Germany Filed July 10, 1968, Ser. No. 743,703
Claims priority, application Germany, July 25, 1967, S 110,995
Int. Cl. H01j 29/72
U.S. Cl. 315—27 10 Claims

ABSTRACT OF THE DISCLOSURE

A base circuit connected to the base electrode of a scanning transistor controls the transistor. A current path connected between the emitter and collector electrodes of the transistor conducts in opposition to the forward direction of the transistor. A tank circuit connected in parallel with the current path includes a first inductor and a capacitor connected in series circuit with each other between the emitter and collector electrodes of the transistor with the first inductor connected to the emitter electrode and a second inductor connected in parallel with the series circuit. A source of DC voltage is coupled to the second conductor of the tank circuit via a switching transistor and a transformer coupling to the second inductor when the scanning transistor is in its nonconductive condition.

DESCRIPTION OF THE INVENTION

The present invention relates to a horizontal deflection circuit for a television system. More particularly, the invention relates to a horizontal deflection circuit for the electron beam of the picture tube of a television system.

The present invention is an improvement over the horizontal deflection circuit disclosed in copending patent application Ser. No. 733,560, filed May 31, 1968. The horizontal deflection circuit of the present invention as well as that of the copending patent application includes a scanning transistor controlled via its base circuit. A diode is connected between the emitter and collector electrodes of the line end transistor with a polarity for conduction in opposition to the forward direction of said transistor. A tank circuit is connected in parallel with the diode between the emitter and collector electrodes.

In the copending patent application, a source of DC feeding voltage is connected to the parallel-connected capacitor of the tank circuit via a pulse keyer which functions as a switch, when the scanning transistor is in its non-conductive condition. This causes the voltage of the source of feeding voltage to be at least equal to the recoil voltage at the parallel capacitor. A charge capacitor is connected in series with the inductor of the tank circuit, said charge capacitor being connected to the emitter electrode of the scanning transistor.

The total losses of the horizontal deflection circuit are compensated for by the high voltage source of feeding voltage. Simultaneously, it is possible to utilize scanning transistors having a permissible blocking voltage which is not too much greater than the feeding voltage. There is, however, a close relation between the magnitude of the feeding voltage and the required blocking voltage. If a transistor is utilized which has a blocking voltage or a voltage at which it is switched to its non-conductive condition which is higher in an appropriately similar current range, this being advantageous for line deflection, the restoring voltage and the feeding voltage would also have to be increased in magnitude. This would eliminate the advantage of the permissible direct use of the rectified power supply voltage. In accordance with the present invention, a manner of avoiding the correlation of both voltages is indicated.

The principal object of the present invention is to provide a new and improved horizontal deflection circuit for the electron beam of the picture tube of a television system.

An object of the present invention is to provide a horizontal deflection circuit for a television system in which the corelation between the magnitude of the feed voltage and the magnitude of the scanning transistor blocking voltage is eliminated.

An object of the present invention is to provide a horizontal deflection circuit for a television system which is of simple structure and is efficient, effective and reliable in operation.

In accordance with the present invention, in a horizontal deflection circuit of the type described in the copending application, utilizing a scanning transistor which is controlled via the base circuit and having a current path connected between the emitter and collector electrodes for conduction in opposition to the forward direction of the transistor and a tank circuit connected in parallel with the current path and having an inductor connected in series with a capacitor, the inductor being connected to the emitter electrode, a source of DC voltage is coupled to the inductor of the tank circuit via a switching transistor and a transformer coupling when the scanning transistor is in its non-conductive condition. The present invention utilizes the feature that during the energizing of the tank circuit from a source of direct low voltage or low DC voltage a considerably higher oscillating voltage occurs and thereby blocks the line end transistor, or switches the scanning transistor to its non-conductive condition, to additionally connect a source of direct high voltage or high DC voltage to the tank circuit. The source of direct high voltage is applied, while the scanning transistor is in its non-conductive condition, to a point of the tank circuit in a manner whereby the entire consumed energy is derived from the source of direct high voltage instead of the source of direct low voltage. The source of direct low voltage may thus be a charge capacitor which remains almost constantly charged.

A portion of the tank circuit of the horizontal deflection circuit of the present invention comprises an autotransformer through which the source of direct voltage is coupled to the tank circuit. Adjustment of the transformer ratio permits the adjustment of the restoring voltage to the permissible blocking voltage of the desired scanning transistor. Such adjustment is preferably a transformer-free rectified power supply voltage. The horizontal deflection circuit of the present invention eliminates the relatively rigid corelation between the magnitude of the feeding voltage and the magnitude of the blocking voltage of the scanning transistor caused by the restrictive diode circuit. To compensate for losses, for example, it is preferable to utilize a rectified power supply voltage and simultaneously utilize a scanning transistor with a freely selective blocking voltage to a considerable extent without restriction due to the circuit utilized. The circuit of the present invention also permits the utilization of deflection yokes from vacuum tube circuits.

In the horizontal deflection circuit of the present invention, the scanning transistor is blocked or switched to its non-conductive condition by a first control pulse. After a short delay, a switching transistor couples the source of DC voltage to a restrictive transformer after the oscillating voltage has attained appropriate magnitude. This results in a slight charge, so that small requirements are made of the switching transistor. The first control pulse indicates the initiation of the return of the electron beam. During the return of the electron beam, a second control pulse, which indicates the initiation of the scanning operation of the electron beam, switches the switching transistor to its nonconductive condition. The charge and feed voltage variations may be regulated by regulation of the interval between the first and second control pulses.

The return capacitor, which essentially represents the capacitance of the tank circuit, may be basically eliminated. This may be accomplished if the switching transistor is operated inversely or is connected in parallel with a diode connected to conduct in a direction opposite to the forward direction of said switching transistor. In such case the smoothing or filter capacitor of the rectified power supply voltage operates as the return or restoring capacitor. During the first part of the return of the electron beam, the available energy of the inductor of the tank circuit is transferred to the smoothing or filter capacitor and is returned therefrom during the second part of the return of the electron beam. A small capacitance is preferably maintained in the tank circuit for operating reasons. The magnitude of the capacitor, which in a restrictive circuit is determined by the return time of the electron beam and the magnitude of the inductance of the tank circuit, is no longer fixed in such case. A reduced capacitance increases the aforementioned range of adjustment of the charge and feed voltage variations.

In accordance with the present invention, a horizontal deflection circuit for the electron beam of the picture tube of a television system comprises a scanning transistor having emitter, collector and base electrodes. A base circuit connected to the base electrode of the transistor controls the transistor. A current path connected between the emitter and collector electrodes conducts in opposition to the forward direction of the transistor. A tank circuit is connected in parallel with the current path. The tank circuit includes a first inductor and a capacitor connected in series circuit with each other between the emitter and collector electrodes of the transistor with the first inductor connected to the emitter electrode and a second inductor connected in parallel with the series circuit. A switching transistor is connected to a transformer coupling coupled to the second inductor of the tank circuit. A source of DC voltage is coupled to the second inductor of the tank circuit via the switching transistor and the transformer coupling when the scanning transistor is in its non-conductive condition. The second inductor comprises an autotransformer. The switching transistor has emitter, collector and base electrodes. An inductor connected to the base electrode of the switching transistor inductively couples the switching transistor to the tank circuit of the scanning transistor.

The tank circuit of the line end transistor further comprises a second capacitor connected in series circuit with the second inductor. The series circuit is connected in parallel with the series circuit of the first inductor and first-mentioned capacitor. A resistive voltage divider is connected between the source of DC voltage and the second capacitor. A pulse source is connected in series with the inductor to the base electrode of the switching transistor for supplying a pulse to switch the switching transistor to its non-conductive condition. The pulse source comprises a transformer having a primary winding connected to a source of pulses, a secondary winding connected in series with the inductor in the base electrode of the switching transistor for supplying a pulse of one polarity to switch the switching transistor to its non-conductive condition and a tertiary winding for supplying a pulse of the other polarity. The tertiary winding is connected to the base electrode of the scanning transistor for switching the scanning transistor to its non-conductive condition upon the return of the electron beam in the picture tube. An additional inductor connected in series in the tertiary winding and inductively coupled to the second inductor of the tank circuit maintains the scanning transistor in its conductive condition during scanning operation of the electron beam in the picture tube.

In order that the present invention may be readily carried into effect it will now be described with reference to the accompanying drawing, wherein the single figure is a circuit diagram of an embodiment of the horizontal deflection circuit of the present invention.

In the figure, a diode D is connected between the emitter and collector electrodes of a scanning transistor $T_1$. The diode D is connected for conduction in opposition to the forward direction of the transistor $T_1$. The diode and the scanning transistor $T_1$ function as electranic switches. The diode D is controlled by a voltage applied to it and the scanning transistor is controlled by a voltage applied to its base electrode.

The horizontal deflection circuit of the figure includes a tank circuit connected in parallel with the diode D. The tank circuit comprises three parallel branches. A first branch of the tank circuit comprises a first conductor L and a first capacitor $C_S$ connected in series circuit with each other. The inductor L functions as the deflection coil of the picture tube and the capacitor $C_S$ functions to provide S-correction. The first branch L, $C_S$ of the tank circuit is connected between the emitter and collector electrodes of the scanning transistor $T_1$. The second branch of the tank circuit comprises a second inductor $L_1$ and a second capacitor $C_L$ connected in series circuit with each other. The second branch $L_1$, $C_L$ is connected in parallel with the first branch L, $C_S$ between the emitter and collector electrodes of the scanning transistor $T_1$. The second inductor $L_1$ is an autotransformer. The second capacitor $C_L$ is a large charge capacitor. The third branch of the tank circuit comprises a third capacitor C connected in parallel with the first and second branches between the emitter and collector electrodes of the scanning transistor $T_1$. The third capacitor C is the return or restoration capacitor of the picture tube.

The first and second capacitors $C_S$ and $C_L$ are connected to the emitter electrodes of the scanning transistor $T_1$. An inductor $L_2$ is connected in series circuit arrangement with an inductor $L_3$ between the base electrode and the emitter electrode of the scanning transistor $T_1$. The inductor $L_2$ is inductively coupled with the second inductor or autotransformer $L_1$.

A switching transistor $T_2$ has an emitter electrode connected to a first tap point of the autotransformer $L_1$ and a base electrode connected to a second tap point of said autotransformer via an inductor $L_4$. Thus, a portion $L_7$ of the inductor $L_1$ is connected in series circuit with the inductor $L_4$ in the emitter-base circuit of the switching transistor $T_2$. The remaining portion $L_6$ of the autotransformer $L_1$ functions as the primary portion thereof. The secondary portion of the autotransformer $L_1$ is connected to the collector electrode of the scanning transistor $T_1$. The collector electrode of the switching transistor $T_2$ is connected to one terminal of the source $U_G$ of DC voltage. The emitter electrode of the scanning transistor $T_1$ is connected to the other terminal of the source $U_G$ of DC voltage. A resistive voltage divider $R_1$, $R_2$ is connected across the source $U_G$ of DC voltage, with the resistive portion $R_2$ thereof connected in shunt across the second capacitor $C_L$ of the tank circuit.

The inductors $L_4$ and $L_3$ are the secondary and tertiary windings, respectively, of a transformer included in a pulse source. The transformer has a primary winding $L_5$ connected to a source of pulses (not shown in the figure). The secondary winding $L_4$ is connected in series with the inductive portion $L_7$, as heretofore described, to the base electrode of the switching transistor $T_2$, for supplying a pulse of one polarity to switch said switching transistor to its non-conductive condition. The tertiary winding $L_3$ is connected to the base electrode of the line end transistor $T_1$ for switching said scanning transistor to its non-conductive condition upon return of the electron beam in the picture tube. The inductor $L_2$, which is inductively coupled to the second inductor $L_1$ of the tank circuit, maintains the scanning transistor $T_1$ in its conductive condition during scanning operation of the electron beam in the picture tube.

The line return or restoration of the electron beam is initiated when the scanning transistor $T_1$ is switched to its conductive condition by a first positive pulse provided via the pulse source transformer. The first positive pulse is provided via the primary and tertiary windings $L_5$ and $L_3$ to the base electrode of the scanning transistor $T_1$. During scanning operation of the electron beam, the scanning transistor $T_1$ is biased by a voltage from the inductor $L_2$ which maintains said transistor in its conductive condition. The deflection energy which was available at the completion of the scanning operation from the line then oscillates in the tank circuit. Magnetic energy is thus converted into electric energy and the restoring or return voltage is built up.

The voltage applied to the base electrode of the switching transistor $T_2$ via the pulse source, and more specifically via the primary and secondary windings $L_5$ and $L_4$ of such source, is insufficient to switch said switching transistor to its conductive condition. On the other hand, however, when the voltage of the autotransformer $L_1$ reaches a specific magnitude, a bias voltage is applied to the base electrode of the switching transistor $T_2$ via the tapped portion $L_7$ of said autotransformer. The bias voltage applied to the base electrode of the switching transistor $T_2$ switches said transistor to its conductive condition.

When the switching transistor $T_2$ is switched to its conductive condition, it connects the source $U_G$ of DC voltage to the primary portion $L_6$ of the autotransformer $L_2$. This occurs when the voltage of the primary portion $L_6$ of the autotransformer $L_1$ has almost reached the magnitude of the source $U_G$ of DC voltage. The electric energy is then transferred from the source $U_G$ of DC voltage to the tank circuit.

The completion of the return or restoration of the electron beam, and thus also the initiation of the scanning operation of the electron beam, is so determined that a second negative pulse switches the switching transistor $T_2$ to its nonconductive condition. The second negative pulse is of greater magnitude and longer duration than the first positive pulse and is supplied to the base electrode of the switching transistor $T_2$ via the primary and secondary windings $L_5$ and $L_4$, respectively, of the pulse source transformer. When the switching transistor $T_2$ is switched to its non-conductive condition, the source $U_G$ of DC voltage is disconnected from the autotransformer $L_1$. The second negative pulse is insufficient to switch the condition of the scanning transistor $T_1$.

After the source $U_G$ of DC voltage is disconnected from the autotransformer $L_1$, the voltage of said autotransformer, and thereby the collector voltage of the scanning transistor $T_1$, is decreased in magnitude until the diode D is switched to its conductive condition and the scanning operation commences. During this period, a voltage provided by the inductor $L_2$ is applied to the scanning transistor $T_1$ and maintains said scanning transistor in its conductive condition until the termination of the scanning operation. The second capacitor $C_L$ is charged via the resistive voltage divider $R_1$, $R_2$. The charging of the second capacitor $C_L$ assists in the operation of the circuit.

While the invention has been described by means of specific example and in a specific embodiment, I do not wish to be limited thereto, for obvious modifications will occur to those skilled in the art without departing from the spirit and scope of the invention.

I claim:

1. A horizontal deflection circuit for the electron beam of the picture tube of a television system, said horizontal deflection circuit comprising a scanning transistor having emitter, collector and base electrodes;

a base circuit connected to the base electrode of said transistor for controlling said transistor;

a current path connected between the emitter and collector electrodes for conduction in opposition to the forward direction of said transistor;

a tank circuit connected in parallel with said current path, said tank circuit including a first inductor and a capacitor connected in series circuit with each other between the emitter and collector electrodes of said transistor with the first inductor connected to said emitter electrode and a second inductor connected in parallel with said series circuit;

transformer coupling means coupled to the second inductor of said tank circuit;

a switching transistor connected to said transformer coupling means; and a source of DC voltage coupled to the second inductor of said tank circuit via said switching transistor and said transformer coupling means when said scanning transistor is in its non-conductive condition.

2. A horizontal deflection circuit as claimed in claim 1, wherein said second inductor comprises an autotransformer.

3. A horizontal deflection circuit as claimed in claim 1, wherein said switching transistor has emitter, collector and base electrodes, and further comprising inductive means connected to the base electrode of said switching transistor for inductively coupling said switching transistor to the tank circuit of said scanning transistor.

4. A horizontal deflection circuit as claimed in claim 1, wherein the tank circuit of said scanning transistor further comprises a second capacitor connected in series circuit with said second inductor, said series circuit being connected in parallel with the series circuit of said first inductor and first-mentioned capacitor, and further comprising a resistive voltage divider connected between said source of DC voltage and said second capacitor.

5. A horizontal deflection circuit as claimed in claim 1, wherein said switching transistor has emitter, collector and base electrodes and the tank circuit of said line end transistor further comprises a second capacitor connected in series circuit with said second inductor, said series circuit being connected in parallel with the series circuit of said first inductor and first-mentioned capacitor, and further comprising inductive means connected to the base electrode of said switching transistor for inductively coupling said switching transistor to the tank circuit of said scanning transistor and a resistive voltage divider connected between said source of DC voltage and said second capacitor.

6. A horizontal deflection circuit as claimed in claim 1, wherein said switching transistor has emitter, collector and base electrodes, and further comprising inductive means connected to the base electrode of said switching transistor for inductively coupling said switching transistor to the tank circuit of said scanning transistor and pulse means connected in series with said inductive means to the base electrode of said switching transistor for supplying a pulse to switch said switching transistor to its non-conductive condition

7. A horizontal deflection circuit as claimed in claim 6, wherein said pulse means comprises transformer means having a primary winding connected to a source of pulses, a secondary winding connected in series with the inductive means to the base electrode of said switching transistor for supplying a pulse of one polarity to switch said switching transistor to its non-conductive condition and a tertiary winding for supplying a pulse of the other polarity.

8. A horizontal deflection circuit as claimed in claim 7, wherein the tertiary winding of said pulse means is connected to the base electrode of said scanning transistor for switching said scanning transistor to its non-conductive condition upon return of the electron beam in said picture tube, and further comprisng an additional inductor connected in series with said tertiary winding and inductively coupled to the second inductor of said tank circuit for maintaining said scanning transistor in its conductive condition during scanning operation of the electron beam in said picture tube.

9. A horizontal deflection circuit for the electron beam of the picture tube of a television system, said horizontal deflection circuit comprising a scanning transistor having emitter, collector and base electrodes and an emitter-collector path;

a base circuit connected to the base electrode of said transistor for controlling said transistor;

a diode connected in parallel with the emitter-collector path of said transistor for conduction in opposition to the forward direction of said transistor;

a tank circuit connected in parallel with said current path, said tank circuit including a first inductor and a capacitor connected in series circuit with each other between the emitter and collector electrodes of said transistor with the first inductor connected to said emitter electrode and a second inductor connected in parallel with said series circuit;

transformer coupling means coupled to the second inductor of said tank circuit;

a switching transistor connected to said transformer coupling means; and a source of DC voltage coupled to the second inductor of said tank circuit via said switching transistor and said transformer coupling means when said scanning transistor is in its non-conductive condition.

10. A horizontal deflection circuit for the electron beam of the picture tube of a television system, said horizontal deflection circuit comprising a scanning transistor having emitter, collector and base electrodes and an emitter-collector path which is conductive in both directions;

a base circuit connected to the base electrode of said transistor for controlling said transistor;

a tank circuit connected in parallel with said current path, said tank circuit including a first inductor and a capacitor connected in series circuit with each other between the emitter and collector electrodes of said transistor with the first inductor connected to said emitter electrode and a second inductor connected in parallel with said series circuit;

transformer coupling means coupled to the second inductor of said tank circuit;

a switching transistor connected to said transformer coupling means; and a source of DC voltage coupled to the second inductor of said tank circuit via said switching transistor and said transformer coupling means when said scanning transistor is in its non-conductive condition.

No references cited.

RODNEY D. BENNETT, Jr., Primary Examiner

J. G. BAXTER, Assistant Examiner